United States Patent
Herrera Caballero et al.

(10) Patent No.: US 11,388,786 B2
(45) Date of Patent: Jul. 12, 2022

(54) INDUCTION HEATING DEVICE

(71) Applicant: AKTIEBOLAGET SKF, Gothenburg (SE)

(72) Inventors: Alberto Javier Herrera Caballero, Utrecht (NL); Ton Ramaker, Zaandam (NL); Dave Spitzer, Sassemheim (NL)

(73) Assignee: AKTIEBOLAGET SKF, Gothenburg (SE)

( * ) Notice: Subject to any disclaimer, the term of this patent is extended or adjusted under 35 U.S.C. 154(b) by 275 days.

(21) Appl. No.: 16/868,937

(22) Filed: May 7, 2020

(65) Prior Publication Data
US 2020/0367325 A1 Nov. 19, 2020

(30) Foreign Application Priority Data

May 15, 2019 (DE) .......................... 102019207024.8

(51) Int. Cl.
*H05B 6/10* (2006.01)
*H05B 6/06* (2006.01)
*H05B 6/36* (2006.01)

(52) U.S. Cl.
CPC .............. *H05B 6/101* (2013.01); *H05B 6/06* (2013.01); *H05B 6/36* (2013.01)

(58) Field of Classification Search
CPC . C21D 1/42; C21D 11/00; C21D 9/32; C21D 9/40; F16C 2240/06; F27B 9/029; H05B 6/06; H05B 6/101; H05B 6/36; H05B 6/44; Y02P 10/25
USPC .......................................................... 219/635
See application file for complete search history.

(56) References Cited

U.S. PATENT DOCUMENTS

| | | | |
|---|---|---|---|
| 9,012,819 B2 * | 4/2015 | David | C21D 1/42 |
| | | | 219/661 |
| 2018/0177002 A1 | 6/2018 | Caballero et al. | |
| 2018/0279421 A1 | 9/2018 | Caballero et al. | |
| 2018/0376543 A1 * | 12/2018 | Kang | H05B 6/062 |

FOREIGN PATENT DOCUMENTS

| | | |
|---|---|---|
| EP | 2728965 A1 | 5/2014 |
| JP | 2005307307 A | 11/2005 |
| JP | 2009238375 A | 10/2009 |

OTHER PUBLICATIONS

Search Report from the Netherlands Patent Office dated Feb. 23, 2021 in related application NL 2025149, and translation thereof.

* cited by examiner

*Primary Examiner* — Dana Ross
*Assistant Examiner* — Joe E Mills, Jr.
(74) *Attorney, Agent, or Firm* — J-Tek Law PLLC; Scott T. Wakeman; Mark A. Ussai

(57) ABSTRACT

An induction heating device for heating a metal article includes a support plate with an upper surface for receiving the metal article, and a plurality of induction coils, which are arranged concentrically around an axis and are provided at an underside of the support plate. Each induction coil is connected to and selectively powered by a generator, and at least one temperature probe is disposable on the metal article during heating in order to monitor and control the heating of the article.

10 Claims, 4 Drawing Sheets

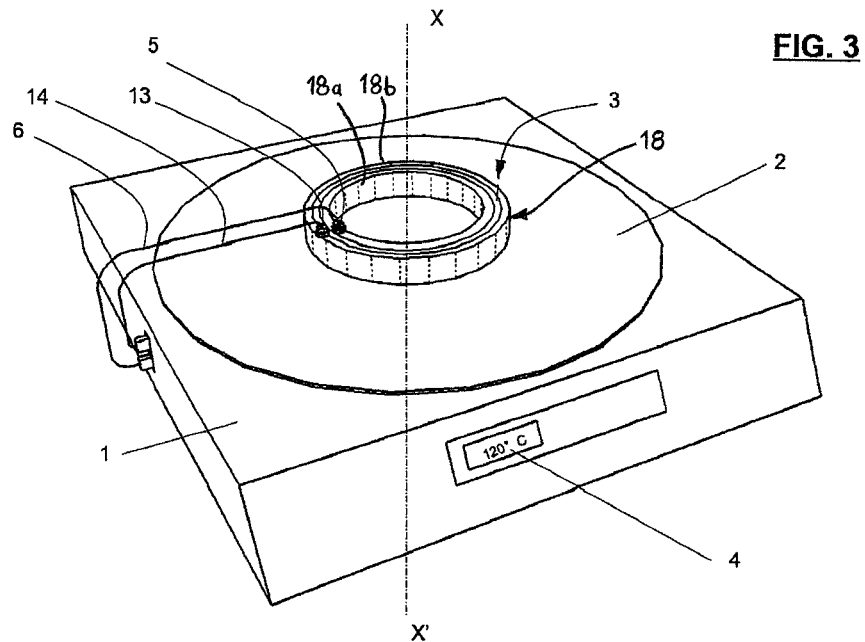
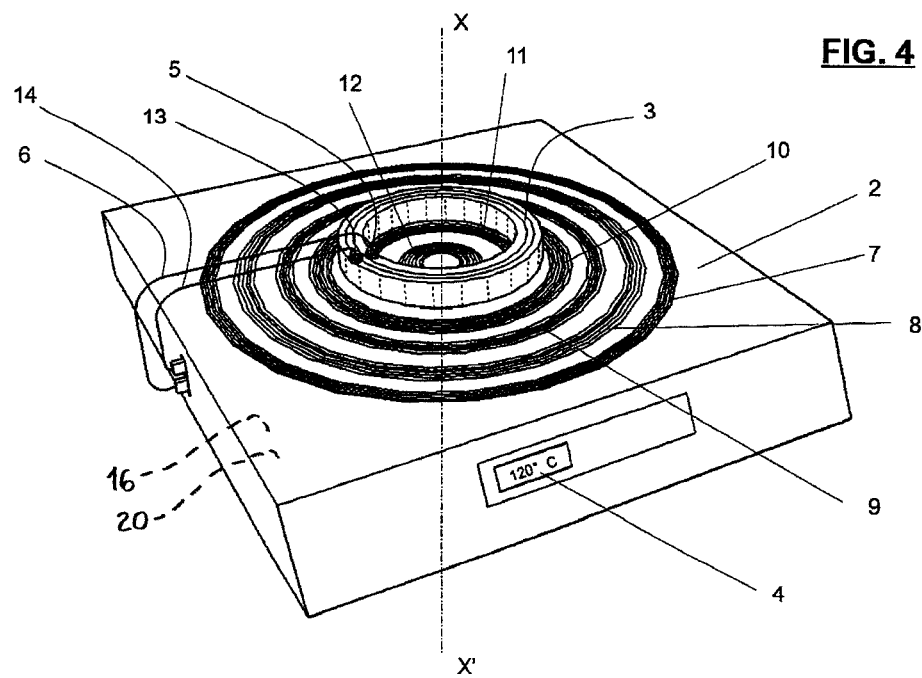

INDUCTION HEATING DEVICE

CROSS-REFERENCE

This application claims priority to German patent application no. 102019207024.8 filed on May 15, 2019, the contents of which are fully incorporated herein by reference.

BACKGROUND OF THE INVENTION

The present invention relates to heaters, and more particularly to induction heaters.

Induction heaters typically include one or more induction coils for heating a metal article, such as a rolling element bearing, a ring or a gear, by inducing eddy currents in the metal article.

EP 2728965A1 describes a known type of bearing induction heater comprising a closed magnetic core closed by a removeable closing yoke, and around which a bearing to be heated is placed. Moreover, two temperature probes are used during a heating cycle; one temperature probe monitors the temperature of the inner ring of the bearing and the other temperature probe monitors the temperature of the outer ring of the bearing. The difference between the two temperatures triggers a switchover between a first portion of the heating cycle and a second portion of the heating cycle. The heating rate during the second portion is smaller than the one during the first portion.

US 2018/0279421A1 describes another known type of bearing induction heater. The heater comprises a plate with an upper surface for receiving a side face of a bearing to be heated. A plurality of concentrically arranged induction coils are provided at an underside of the support plate. A plurality of temperature sensors are arranged on the upper surface of the support plate at different radial distances from a central axis of the coils, each coil being associated with one or more temperature sensors.

When a bearing comprising an inner ring and an outer ring is heated by an induction heater, it is important that the difference of temperature between the inner and the outer rings doesn't exceed a predetermined value, in order to avoid damage of the bearing. Furthermore, it is very important to not exceed the target temperature, otherwise there is a high risk of damage to some components, such as the lubricant or the seals of the bearings, which cannot withstand as high temperatures as the metallic elements, such as rings or rolling elements. With the induction heating devices known today, the faster the metal article is heated, the more difficult it is to avoid this temperature overshooting problem.

SUMMARY OF THE INVENTION

It is an object of the present invention to provide an induction heating device for heating up a metal article with a side face, in particular a bearing having an inner ring and an outer ring.

According to the invention, the induction heating device comprises a support plate with an upper surface for receiving the side face of the metal article. A plurality of concentrically arranged induction coils are provided at an underside of the support plate, and each induction coil is connected to and selectively powered by a generator.

The device also comprises at least one temperature probe to be placed on the metal article during heating in order to monitor and control the heating of the article.

According to other aspects of the invention which are advantageous, but not compulsory, such an induction heating device may incorporate one or several of the following features:
 there is only one temperature probe;
 there are two temperature probes;
 the metal article is a bearing with an inner ring and an outer ring;
 there is only one temperature probe and it is placed on an upper side face of the bearing;
 there are two temperature probes, one is located on an upper side face of the inner ring, and the other one is located on an upper side face of the outer ring.

It is another aspect of the invention to provide a method to heat up a metal article with an induction heating device according to the invention, the method comprising the steps of:
 placing the metal article on the upper surface of the plate and the at least one temperature probe on the article;
 estimating the position of the metal article on the upper surface of the plate and estimating some dimensional characteristics of the article such as its center, its height and its mass;
 determining, based on these estimations, an initial heating strategy to be applied, i.e. which coils to be powered and at which power level;
 starting the heating according to the initial heating strategy;
 using the measurements of the at least one temperature probe to better estimate the dimensional characteristics of the article, to measure the delay with which the temperature measured by the at least one temperature probe changes; and to analyze the speed of change (average acceleration of the temperature) to determine how much the temperature of the article will continue to rise once the heating process is stopped;
 optionally adjusting the parameters of the initial heating strategy based on the results obtained during the previous step; and
 running a heating cycle so as to bring the article at the desired temperature.

According to other aspects of the invention which are advantageous but not compulsory, such a method may incorporate one or several of the following features:
 the heating cycle comprises the following successive steps:
  a determination step during which the full allowed power profile is used until the stabilization of the temperature speed, and during which an estimated end temperature is continuously calculated;
  a main step during which the heating continues so as to try to maintain the maximum heating speed, but during which however the temperature speed is kept constant;
  an approach step during which the heating power is gradually reduced until a predetermined minimum temperature speed is reached or the target temperature becomes very close, so as to limit the maximum absolute temperatures on the bottom of the article, and to reduce the difference of temperature between the top face and the bottom face, for each ring;
  an equalization step during which the heating is stopped, and the measured and estimated temperatures converge to the target temperature until they reach the target temperature;
 the method further comprises a successive standby step during which the heating is still stopped and one keeps monitoring the temperature of the bearing and the temperature change, until when either an operator stops the session or the bearing has cooled down by 10% from its target temperature, and a further successive reheat step during which heating is started again with first a full power is used until a substantial temperature rise is reached, and then a reduced amount of power is used, until the target temperature is reached again;

the method further comprises, once the target temperature has been reached at the end of the equalization step, a step during which the bearing is kept at the target temperature during a given period of time or until the user stops the heating session, and during which minimal heating is generated so as to compensate for the heat loss in the environment;

during heating, more energy is focused towards the center of the article.

With present device, it is possible to heat up a metal article rapidly and without a risk of exceeding or "overshooting" of the temperature to be reached and with no damage to the article.

Also, with the present invention, when a bearing with an inner ring and an outer ring is heated up, the temperature difference between the inner and outer ring is kept below a safe value.

BRIEF DESCRIPTION OF THE SEVERAL VIEWS OF THE DRAWINGS

The present invention and its advantages will be better understood by studying the detailed description of specific embodiments given by way of non-limiting examples and illustrated by the appended drawings on which:

FIG. 3 shows a second preferred embodiment of an induction heating device according to the invention;

FIG. 4 shows the induction heating device of FIG. 3 and its induction coils, shown without a support plate;

DETAILED DESCRIPTION OF THE INVENTION

Figure 1:
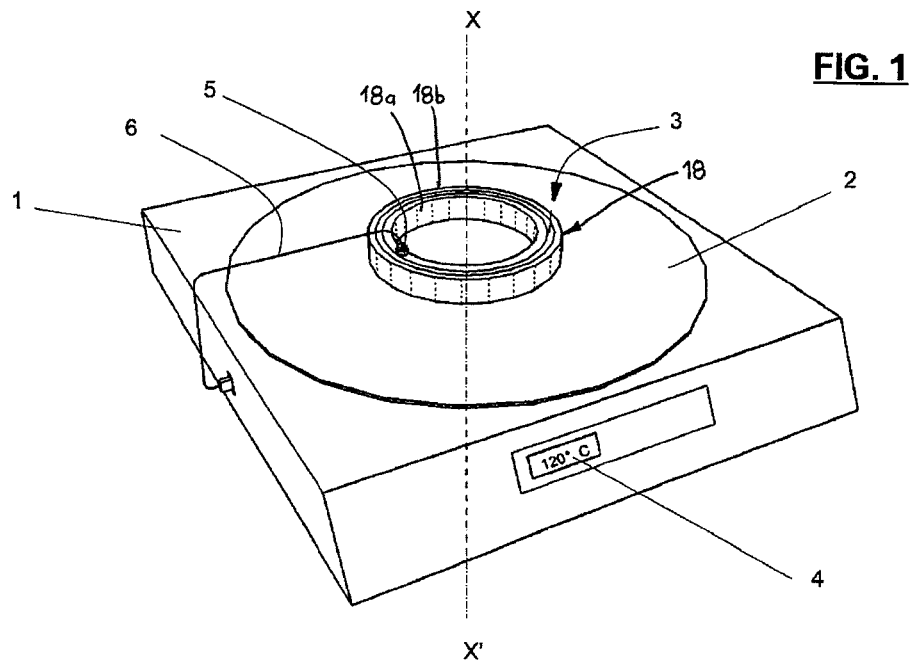
FIG. 1 shows a first preferred embodiment of an induction heating device according to the invention.
Figure 2:
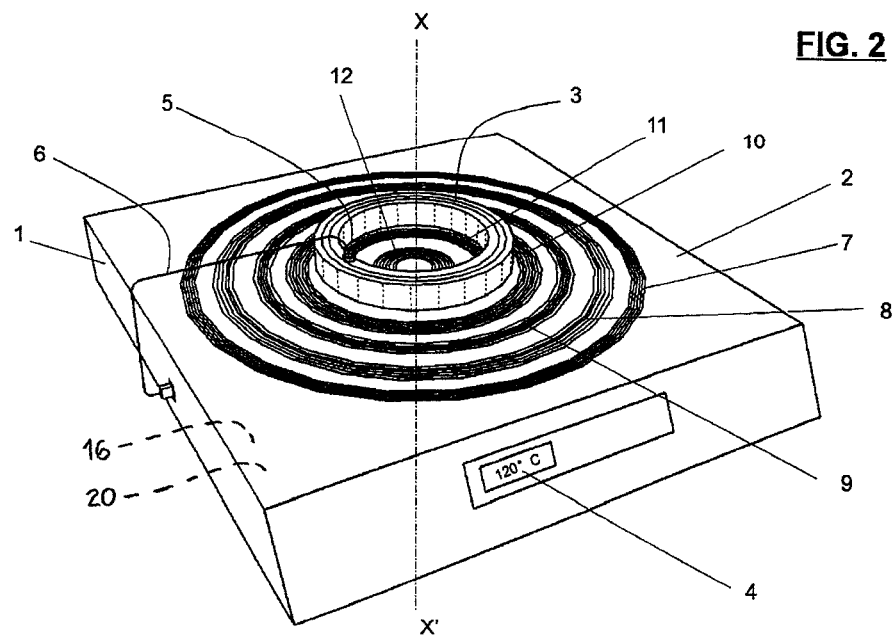
FIG. 2 shows the induction heating device of FIG. 1 and its induction coils, shown without a support plate.

FIGS. 1 and 2 illustrate an induction heating device 1 comprising a support plate 2 with an upper surface for receiving a side face of a metal article 3. A plurality of concentrically arranged induction coils 7, 8, 9, 10, 11 and 12 are concentrically or coaxially arranged around an axis XX' and are provided at an underside of the support plate 2. Each induction coil 7, 8, 9, 10, 11 and 12 is connected to and selectively powered by a generator 16, as described below. The induction coils 7, 8, 9, 10, 11 and 12 vary in size, particularly diametrically, and each can deliver different maximum thermal outputs.

A temperature probe 5 is placed on the metal article 3 and is electrically connected to a remainder of the heating device 1 by means of a wire 6. The temperature probe 5 is used to monitor the heating of the metal article 3.

The heating device 1 further comprises a temperature indicator 4 which can selectively display the temperature measured by the probe 5 or the desired temperature target to which it is desired to heat up the article 3. Preferably, the metal article 3 is a bearing 18 (as depicted), a ring or a gear, but may be any other appropriate article requiring heating. When the article 3 is a bearing 18 with an inner ring 18a and an outer ring 18b, the temperature probe 5 is preferably placed on an upper side face of the inner ring 18a.

The heating device 1 preferably also comprises an alternating current generator or power supply 16 (i.e., a device for supplying electrical power or current) to which each coil 7, 8, 9, 10, 11 and 12 is electrically connected. The generator/power supply 16 is controlled by a control unit 20 which is configured to selectively power the coils 7, 8, 9, 10, 11 and 12 and to determine the load on each coil 7, 8, 9, 10, 11 and 12 when it is being powered. That is, the control unit 20 is configured (i.e., wired, programmed, etc.) to operate the generator 16, such that electric power is supplied only to a select one or more of the coil(s) 7, 8, 9, 10, 11, 12 (or to all of the coils) and at a selected power level(s) (i.e., the amount of electric power supplied), and to monitor the power loading on all of the coils 7, 8, 9, 10, 11, 12. The control unit 20 is also electrically connected with the temperature probe 5 to receive temperature measurements therefrom.

The control unit 20 is further configured or programmed to execute a heating strategy or cycle to increase the temperature of the bearing inner ring 18a to a value that enables the bearing 18 to be shrink-fitted onto a shaft via thermal expansion and contraction. Typically, the inner ring 18a is heated to a temperature of around 110° C. The heating cycle includes induction heating of both the inner ring 18a and the outer ring 18b to prevent an excessive temperature difference between the bearing rings 18a, 18b that could damage the bearing 18. As discussed above, the measurement of the temperature probe 5 is fed to the control unit 20, and is used to control the heating of the metal article 3.

FIGS. 3 and 4 illustrate a second preferred embodiment of an induction heating device 1. FIGS. 3 and 4 illustrate the same induction heating device 1 as the one of FIG. 1, but with two temperature probes 5, 13, each electrically connected to the remainder of the induction device 1 by a separate wire 6, 14, respectively. The temperature probes 5, 13 are each disposable upon the metal article 3.

In case of a bearing 18 with an inner ring 18a and an outer ring 18b, a first temperature probe 5 is placed on an upper side face of the inner ring 18a, and a second temperature probe 13 is placed on an upper side face of the outer ring 18b.

The heating device 1 further comprises a temperature indicator 4 which can selectively display the temperature measured by each probe 5, 13 or the target temperature to which it is desired to heat up the article 3. The induction heating device 1 (i.e., the control unit 20) continuously monitors the temperature reading(s) during a heating cycle using measurements from the temperature probe(s) 5, 13.

Figure 5:
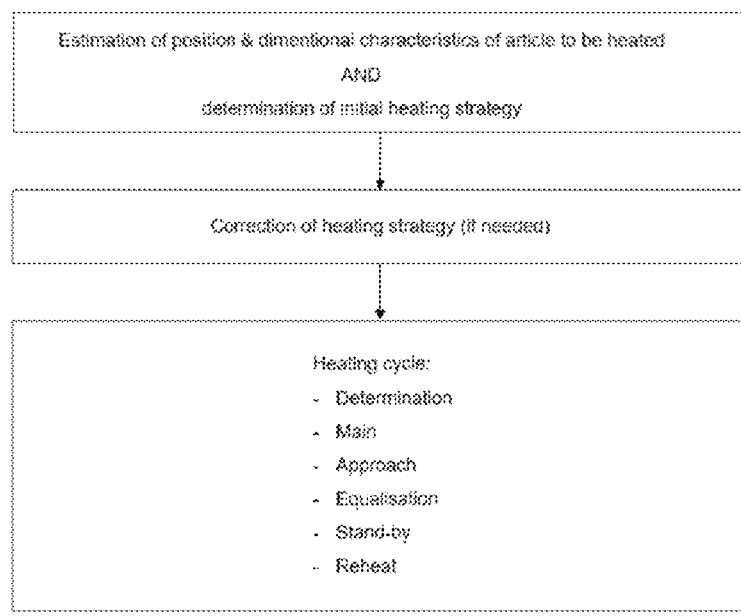
FIG. 5 shows the different steps of a heating process according to the invention.

Referring to FIG. 5, the steps of a method of heating or "heating up" a metal article 3 to a desired target temperature with the present induction heating device 1 are depicted. To start the process, the metal article 3 is placed on the upper surface of the plate 2, and the at least one temperature probe 5 is placed on upper surface of the article 3. Then, an estimation of the position of the article 3 on the upper surface of the plate 2 and an estimation of certain dimensional characteristics of the article 3 are performed by the control unit 20.

This characterization is done through the mapping of energy that every coil 7, 8, 9, 10, 11 and 12 demands or requires. When the metal article 3 is on the plate 2, the amount of current that each coil 7, 8, 9, 10, 11 or 12 requires is different than when there is no metal article on the plate 2 due to electromagnetic interaction. As such, the energy or current readings with the metal article 3 in position are compared with calibrated readings obtained when no metal article 3 is present on the plate 2. This comparison brings normalized readings, which eliminates internal losses and corrects for differences in coil dimensions.

These normalized readings are further processed to correct the limitations of the hardware in detecting abnormal situations. For example, when the metal article 3 is a bearing 18 with a metallic sealing shield which deters or affects a magnetic field, or when the article 3 is too large or too small to be properly read by the innermost coil 12 or by the outermost coil 7.

The processing of this data, also called fingerprint or "footprint" analysis, leads to the determination of an extended fingerprint/footprint of the article 3 from which can be estimated several dimensional characteristics of the metal article 3 such as its center, its height and its mass. This is based on a statistical analysis using a large set of different metal articles 3; in other words, based upon empirical analysis of data taken from various different-sized metal articles 3 and stored within memory of the control unit 20.

Based on these estimations of dimensional characteristics, an initial heating strategy is determined that will be used at the beginning of a heating cycle. This initial heating strategy defines which one or more of the coils 7, 8, 9, 10, 11 and/or 12 needs to be powered and the particular power level for each coil 7, 8, 9, 10, 11 or/and 12 being supplied with power.

In a successive step of the method, the heating of the article 3 starts according to the initial heating strategy, and the measurements or readings of the at least one temperature probe 5 and/or 13 are used in order to improve the estimates on the dimensional characteristics of the article 3 and to heat the article 3 in a fast and accurate way. When the heating process starts, the control unit 20 measures the delay at which the temperature measured by the temperature probe 5 and/or 13 on the upper surface of the article 3 changes. This delay enables the control unit 20 to correct the height estimation of the article 3, if necessary.

Furthermore, by analyzing the speed or rate of change (average acceleration) of the temperature within the article 3, the control unit 20 determines how much the temperature of the article will continue to rise due to thermal inertia caused by internal heat conduction once the heating process is stopped. For example, if the average acceleration of the temperature is very high, the control unit 20 should stop powering the induction coils 7, 8, 9, 10, 11 and/or 12 relatively early otherwise the temperature will continue to increase at a relatively high speed/rate for a significant amount of time.

Based on these temperature measurements, the parameters used for the initial heating strategy are optionally adjusted by the control unit 20, if needed, and stored in a heating strategy. Then, a heating cycle according to that heating strategy is performed. This heating cycle consists of a succession of several steps as will now be explained.

Figure 6:
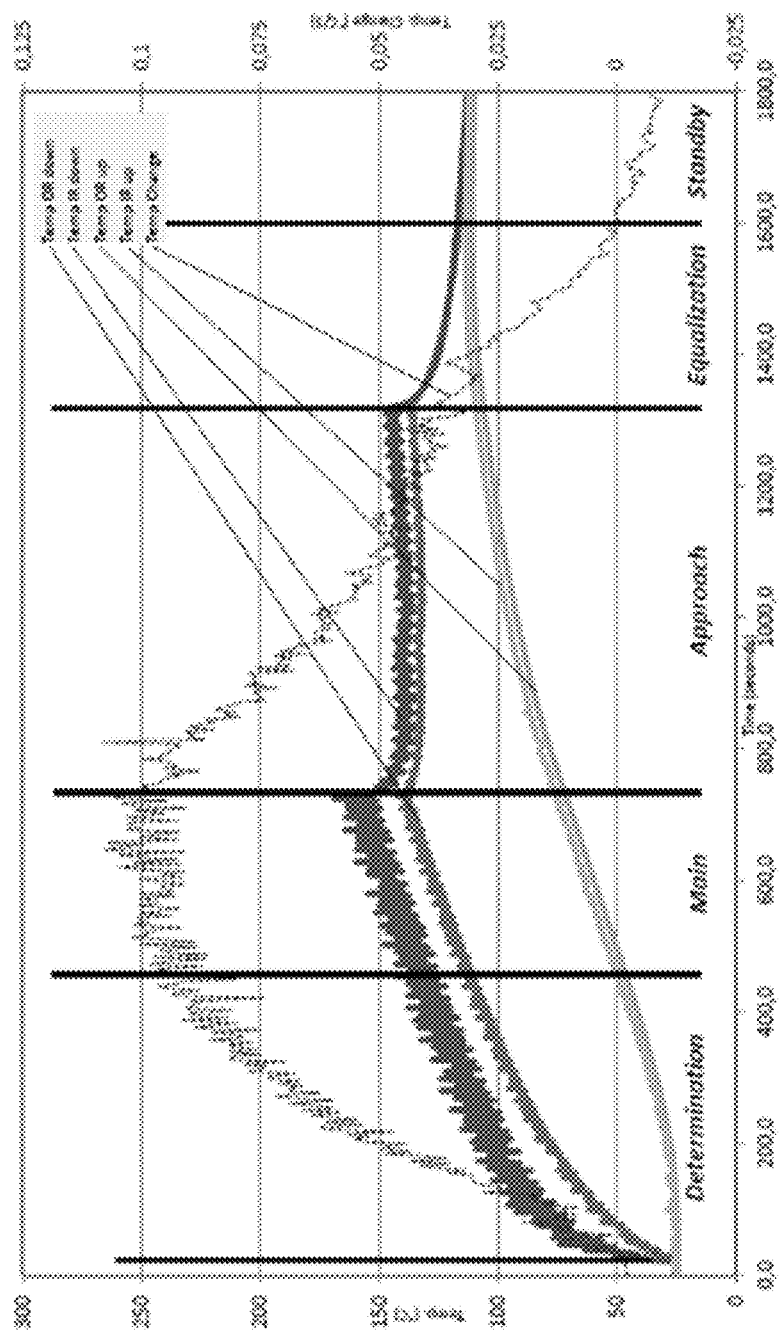
FIG. 6 shows an example of a heating cycle according to the invention.

FIG. 6 illustrates an example of heating cycle with these successive steps for heating a bearing 18 with an induction heating device 1 including the two temperature probes 5, 13. The bearing 18 comprises an inner ring 18a and an outer ring 18b, each ring 18a, 18b having two sides faces. The side face of the inner ring 18a and the side face of the outer ring 18b which are in contact with the upper surface of the support plate 2 are called the "bottom" faces. The other side faces of the inner and outer rings 18a, 18b are called the "top" faces.

One temperature probe 5 is positioned on the top face of the inner ring 18a and the other temperature probe 13 is positioned on the top face of the outer ring 18b, as illustrated in FIG. 4. Furthermore, the temperature of the bottom faces of the inner and outer ring 18a, 18b are estimated.

During a first step called a "determination step", the full allowed power profile, as determined by the fingerprint/footprint analysis, is used. The actual heating delay is established and gradually adjusted, until the transition point is found. Additionally, a total acceleration is measured until a temperature speed/rate stabilization point is reached. These measurements are then used together with the current temperature speed or rate of change to continuously calculate an estimated end temperature, at which the heating cycle/process is stopped due to reaching the target temperature.

For the example illustrated on FIG. 6, for each ring 18a, 18b, initially the temperature difference between the bottom and top faces rises quickly, but gradually starts to stabilize. Also, the temperature change increases almost linearly until reaching the stabilization point.

Then, a second or "main" step starts when the temperature speed or rate of change has stabilized and the stabilization point has been reached. Heating continues so as to maintain the maximum heating speed/rate, possibly corrected only if a ring bottom temperature is estimated to be too high. This is done using an estimate of a ring bottom temperature using the bearing characteristics and the applied average power.

During the main stage, the temperature speed/heating rate is maintained generally constant, and the temperature difference between top and bottom side faces is generally constant due to a constant applied power. The greater the temperature difference between the bearing 18 and the environment, the greater the temperature loss becomes. This effect is most evident when heating bearings with a relatively lesser mass, but the effect is mostly negligible when compared to the heating speed or rate that can be reached during the heating cycle.

Using the established heating delay, average temperature acceleration or rate of change (e.g., rate of increase) from the determination stage and the current temperature speed/rate, an end temperature estimate is continuously calculated. This end temperature estimate is used both as a heating stop but also to determine when to proceed to a subsequent "approach" step.

When the heating cycle or process is nearing the end goal, the heating process enters a ramp down or approach stage, in which the heating power is gradually reduced until a predetermined minimum temperature speed or rate is reached or the measured temperature approaches the target temperature. The approach stage has two goals, first to limit the maximum absolute temperatures on the bottom face of the bearing rings 18a, 18b. The ramp down method stage is designed to keep a steady bottom face temperature and to slowly reduce the difference in temperature between the top face and the bottom face for each ring 18a, 18b. Besides limiting the maximum temperatures in the bearing 18, the ramp down stage has another purpose.

FIG. 6 depicts how the temperature speed or rate of change begins to decline in a mostly linear fashion. The temperature differences between the top face and the bottom face of both rings 18a, 18b start to reduce, such that the maximum temperature in the bearing 18 stops rising and is relatively constant. The top temperature starts to stabilize towards the intended target temperature.

When the estimations for the bearing 18 and the heating performance are sufficiently accurate, the bearing 18 reaches its target temperature near the end of the ramp down stage and heating is stopped. Then, the next step in the process, called the "equalization" step, begins.

During the equalization step, the measured and estimated temperatures converge to the same temperature, which is the target temperature. The temperatures of the ring bottom faces decrease while the temperatures of the ring top faces increase even though the heating has been stopped. This equalization step ends when the temperatures have all stabilized at the target temperature.

At this point, the bearing 18 is ready to be safely mounted (e.g., on a shaft). When the bearing 18 reaches the target temperature, the temperature is well distributed or relatively equal throughout the whole bearing 18, which facilitates the mounting of the bearing 18 on a shaft (not shown) and will limit the occurrence of any mechanical stresses. This reduces any internal slack between the bearing inner and outer rings 18a, 18b and any balls or rollers in between.

In an optional successive step called the "standby" step, the control unit 20 continues monitoring the temperature of the bearing 18 and any subsequent temperature changes. The process transitions out of the standby step when either a user or the control unit 20 stops the heating session/cycle or when the bearing 18 has cooled down by ten percent (10%) from the target temperature.

Then, in another optional and successive step called the "reheat" step, the control unit 20 uses all of the measured temperature behavior of the bearing 18 to start again heating the bearing 18 in order to maintain the target temperature for the user operating the heating device 1. During this step, full power is used until a substantial temperature rise is achieved and then transitions to the minimal heating stage until again reaching the target temperature.

Alternatively and/or optionally, once the target temperature has been reached at the end of the equalization step, the process or method may further comprise a step during which the bearing 18 is kept at the target temperature for a given period of time or until the user stops the heating session. During this step, minimal heating is generated so as to compensate for the heat loss to the environment.

In the example illustrated in FIG. 6, the target temperature has been set to 110° C., and the maximum temperature on the bottom faces of the bearing 18 has been limited to a maximum value of one hundred and fifty degrees Celsius (150° C.) in order to avoid damage to the bearing 18. Also, the temperature difference or "delta temperature" between the top and bottom faces of the bearing 18 was limited to no greater than about ninety degrees Celsius (90° C.). Further, the maximum temperatures reached in the bearing 18 were kept at acceptable values, and it was clearly visible that the temperatures have already equalized when the target temperature was reached. If instead the heating rate was maximized until reaching the target temperature, the bearing 18 or other article 3 may have reached a bottom temperature of two hundred degrees Celsius (200° C.), resulting in a large overshoot in temperature.

Advantageously, the temperature analysis occurs continuously during the entire heating process in order to improve the estimations. Further, during heating, more heating energy is preferably applied on the inner ring 18a of the bearing 18 or the center of a different article 3 being heated, which makes the heating faster.

Further, when the article 3 is a bearing 18 with a cage, rolling elements or sealing shields, and when several coils 7, 8, 9, 10, 11 and/or 12 are powered during the heating process, the power of the central or inner coil(s) 8, 9, 10 or/and 11 is preferably reduced in order to avoid overheating of the cage, shields or rolling elements.

If one coil 7, 8, 9, 10, 11 or 12 is not powerful enough, although originally estimated to be the best candidate to heat up the article 3, then another one of the coils 7, 8, 9, 10, 11 or 12, which can provide a higher power or thermal generation due to a better electromagnetic coupling, is then chosen to be powered (i.e., by the control unit 20).

When the article 3 is a bearing 18 with an inner ring 18a, an outer ring 18b and rolling elements between the rings 18a, 18b, the amount of energy delivered to the inner ring 18a and the outer ring 18b is such that the inner ring 18a heats up faster than the outer ring 18b. However, the control unit 20 is preferably configured to operate the heating device 1 such that the temperature of the inner ring 18a never exceeds the temperature of the outer ring 18b by a predetermined value (typically between 20 and 40° C.), in order to ensure a relatively "tension free" heating. In other words, to make sure that the rolling elements are not compressed up to the point that they generate plastic deformations in the raceways of the rings 18a, 18b.

With the present device 1, it is possible to heat a metal article 3 in a relatively fast way and without damaging it. The device 1 ensures that there is no overshooting of the target temperature at which the metal article 3 is to be heated.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved seal assemblies.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

We claim:

1. A method of heating a metal article with an induction heating device, the method comprising the steps of:
   providing an induction heater including a support plate, a plurality of induction coils arranged concentrically about an axis and disposed beneath an underside of the support plate, each induction coil being connected to and selectively powered by a generator, at least one control unit, and at least one temperature probe disposable upon the metal article;
   placing the metal article on an upper surface of the plate and the at least one temperature probe on the article;

wherein the at least one control unit:
estimates the position of the metal article on the upper surface of the plate and at least one dimensional characteristic of the article;
determines an initial heating strategy including which of the coils to be operated and the power level of each of the coils being operated to bring the article to a desired target temperature;
operates the heater according to the initial heating strategy;
uses measurements from the at least one temperature probe to adjust the at least one estimated dimensional characteristic of the article, to measure the delay by which the measured temperature changes and to analyze the rate of change of the temperature to determine how much the temperature of the article will continue to rise once heating is stopped;
and;
runs a heating cycle so as to heat the article to the desired temperature.

2. The method according to claim 1 wherein the step of estimating at least one dimensional characteristic includes estimating at least one of the center of the article, the height of the article and the mass of the article.

3. The method according to claim 1 further comprising at least one of the following steps:
a determination step during which a full allowed power profile is used until stabilization of a rate of temperature increase, and during which an estimated end temperature is continuously calculated;
a main step during which heating continues to maintain a constant maximum heating rate;
an approach step during which heating power is gradually reduced until reaching a predetermined minimum temperature rate or the measured temperature is close to the target temperature, so as to limit the maximum absolute temperatures on a bottom of the article and to reduce a difference of temperature between a top face and a bottom face of the article; and
an equalization step during which heating is stopped and the measured and estimated temperatures converge until reaching the target temperature.

4. The method according to claim 1 further comprising at least one of the following steps:
a standby step during which heating is stopped and the temperature and temperature change of the article is monitored until either the heating cycle is stopped or the article has cooled down by ten percent of the target temperature; and
a reheat step during which heating is restarted using full power until a substantial temperature rise is achieved and then a reduced amount of power is used until again reaching the target temperature.

5. The method according to claim 1 further comprising the step of maintaining the article at the target temperature for a given period of time or until the heating cycle is stopped so that minimal heating is required to compensate for heat loss to the environment.

6. The method according to claim 1 wherein during heating, more energy is focused towards the center of the article.

7. An induction heating device for heating a metal article, the device comprising:
a support plate with an upper surface for receiving the metal article and an underside;
a plurality of induction coils arranged concentrically about an axis and disposed beneath the underside of the support plate, each induction coil being connected to and selectively powered by a generator;
an alternating current generator electrically connected with each one of the plurality of induction coils and configured to supply electric power to each induction coil;
at least one temperature probe disposable upon the metal article during heating and configured to measure temperature of the article; and
a control unit electrically connected with the at least one temperature probe and with the generator and configured to operate the generator to selectively power the induction coils, to determine the load on each one of the coils when each coil is being powered, to estimate at least one dimensional characteristic of the article, and to determine a heating strategy for operating the induction coils to increase the temperature of the article to about a target temperature, the heating strategy being based at least partly upon the at least one estimated dimensional characteristic.

8. The induction heating device according to claim 7 wherein:
the estimation of the least one dimensional characteristic includes a comparison of electric current demands within one or more of the coils when the article is located on the support plate with stored empirical data within the control unit; and
the determination of the heating strategy includes determining the amount of electric power to be supplied to each of the plurality of induction coils during heating of the article to the target temperature.

9. The induction heating device as according to claim 7 wherein the control unit is further configured to adjust the at least one estimated dimensional characteristic and to adjust the heating strategy during heating of the article based upon temperature measurements from the at least one temperature probe.

10. The induction heating device as according to claim 7 further comprising a temperature indicator configured to display temperature being measured by the at least one temperature probe.

* * * * *